Figure 1:
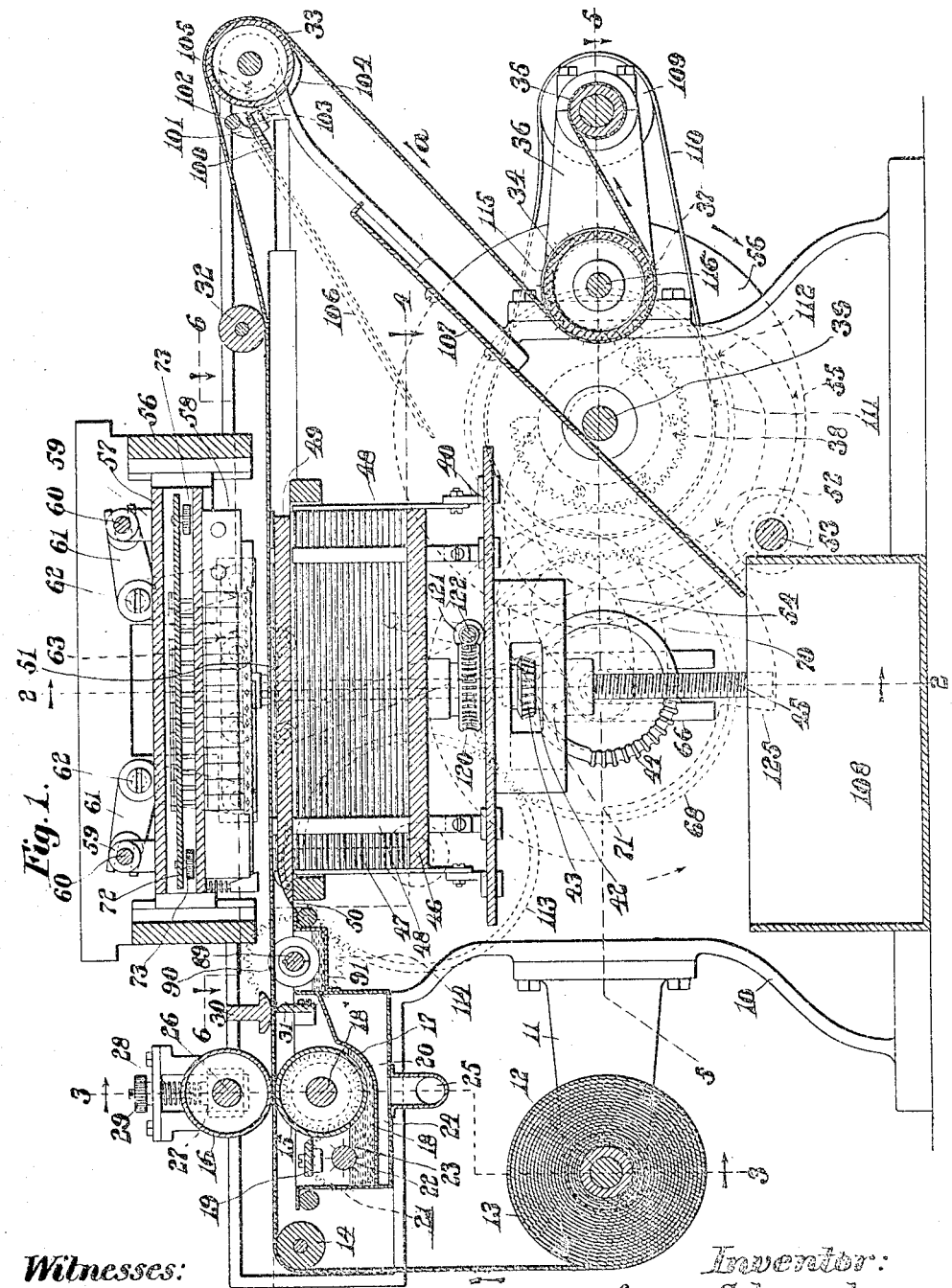

A. SCHWARTZ.
MACHINE FOR APPLYING DUCK TO INNER SOLES.
APPLICATION FILED APR. 6, 1908.

919,648.

Patented Apr. 27, 1909.

7 SHEETS—SHEET 1.

Witnesses:
Howard Hanscom
Nathan C. Lombard

Inventor:
Aaron Schwartz,
by Walter E. Lombard
Atty.

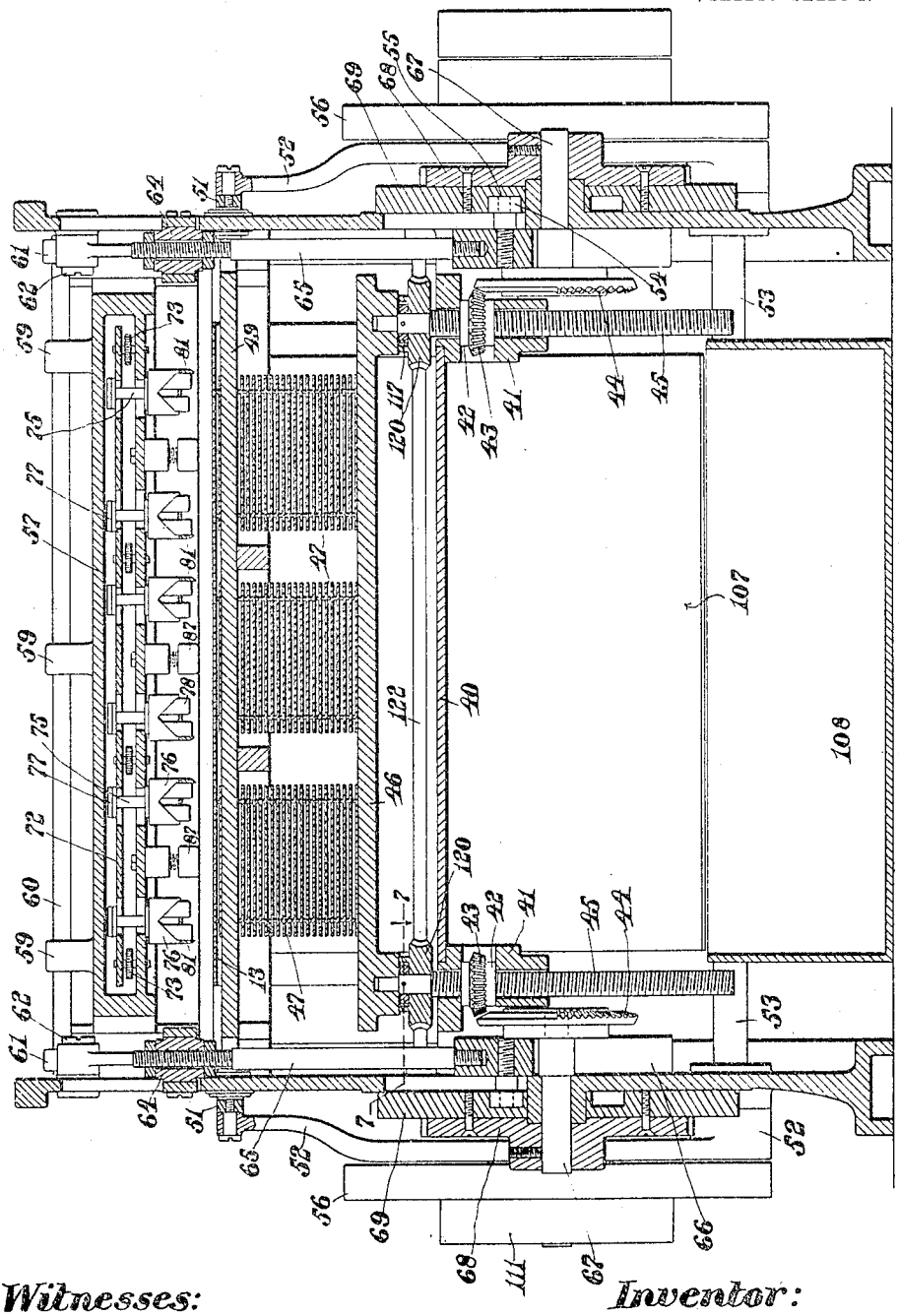

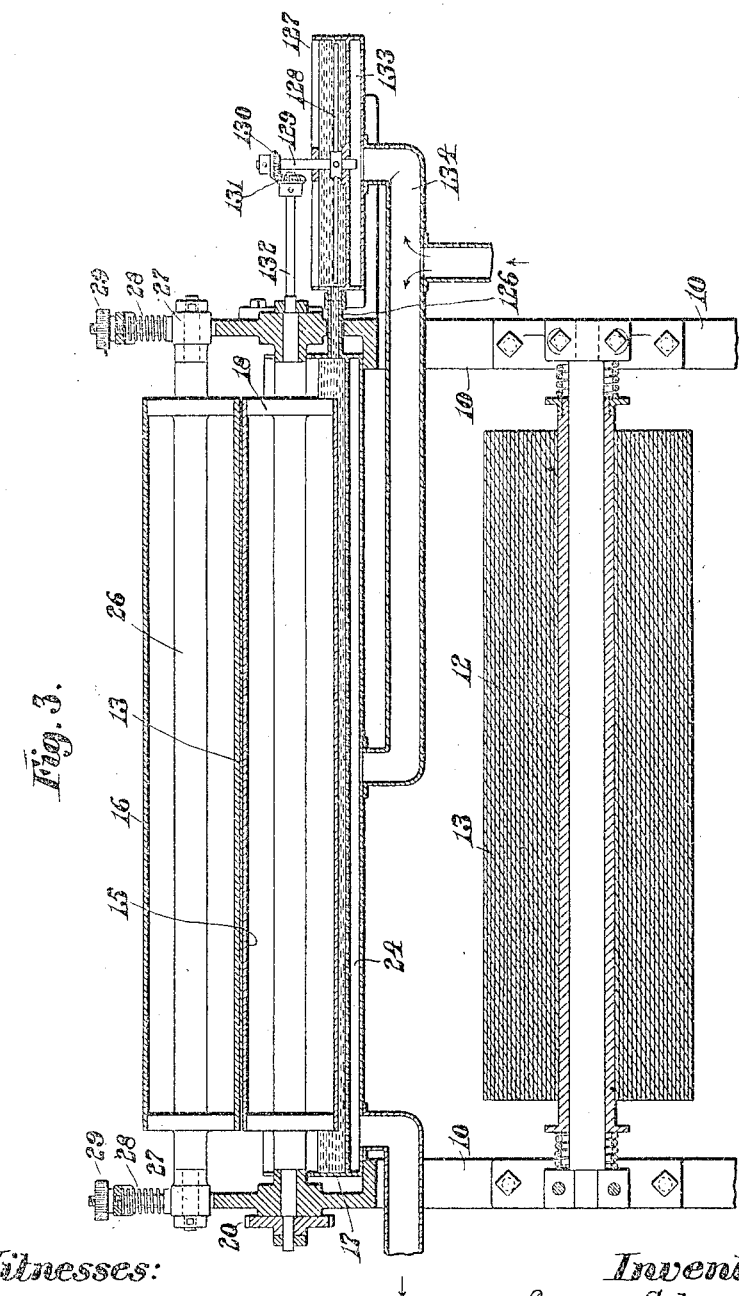

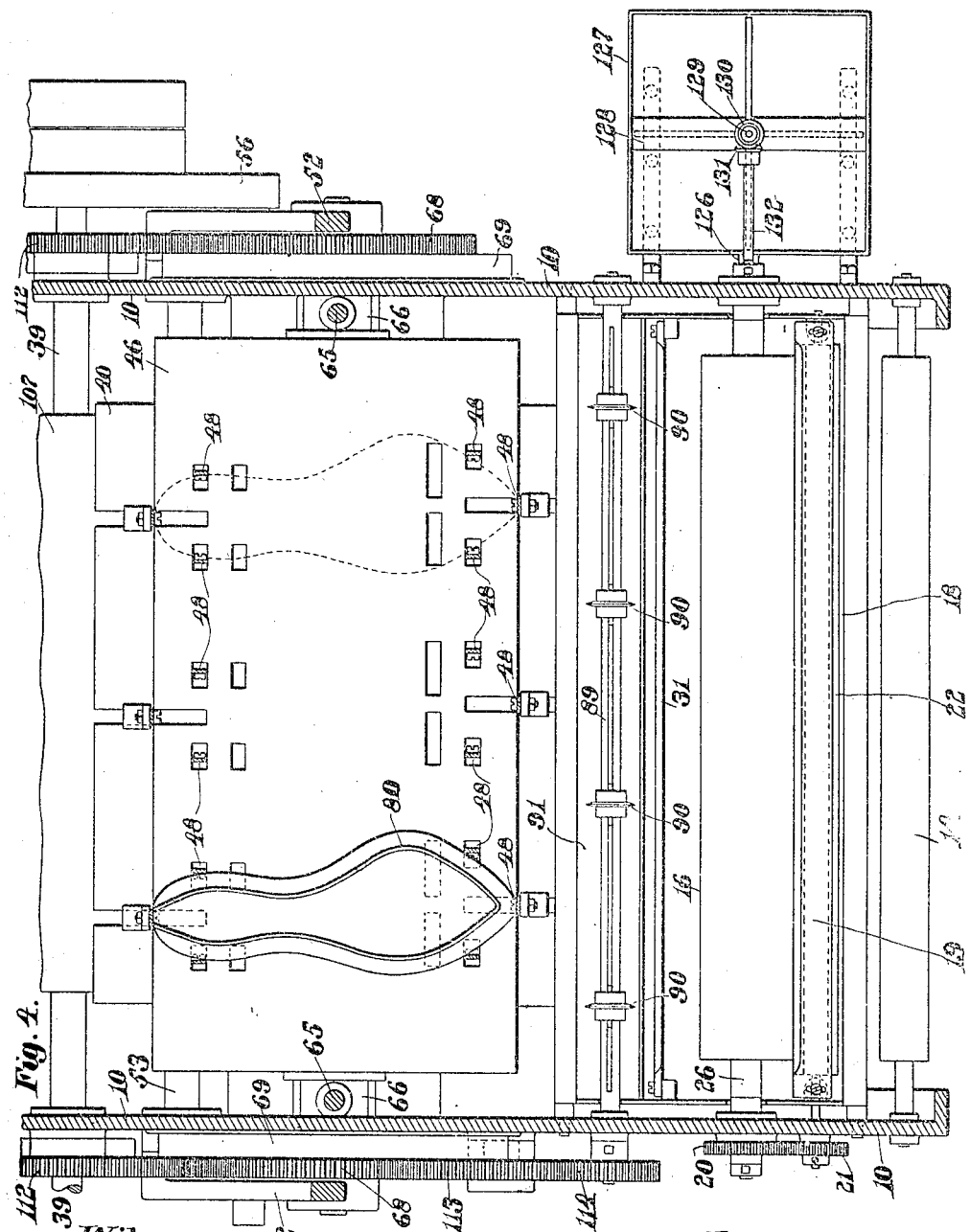

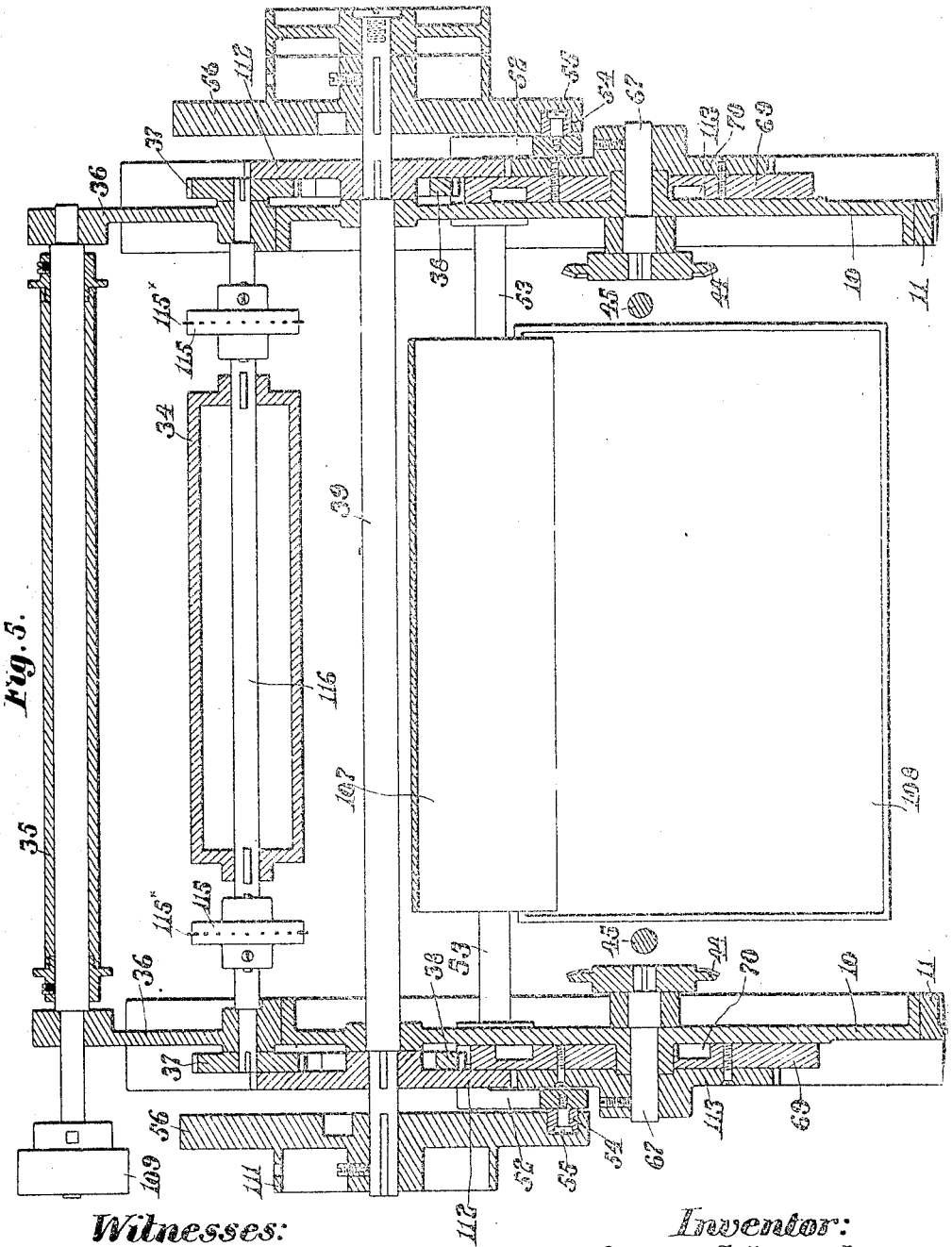

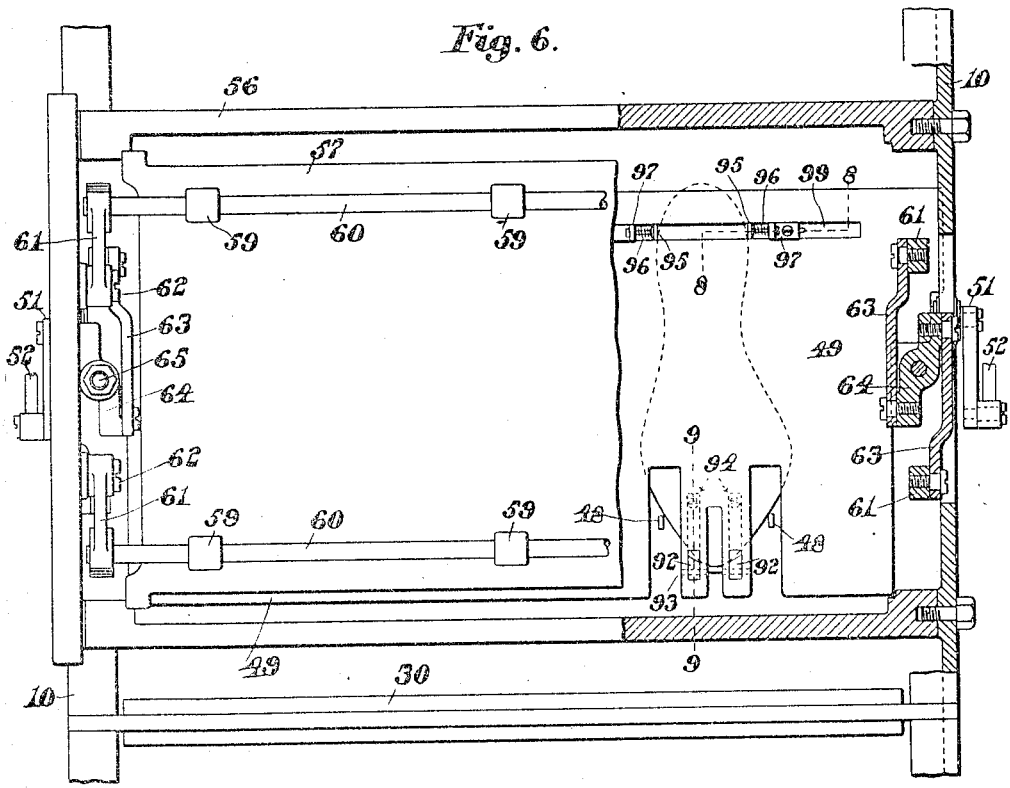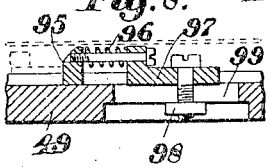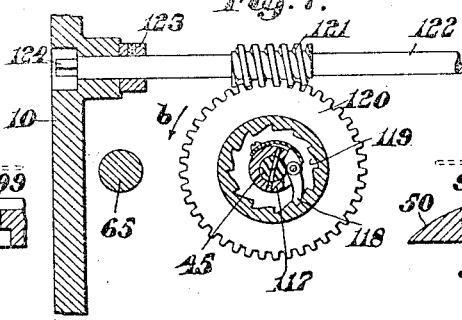

A. SCHWARTZ.
MACHINE FOR APPLYING DUCK TO INNER SOLES.
APPLICATION FILED APR. 6, 1908.
919,648.
Patented Apr. 27, 1909.
7 SHEETS—SHEET 7.
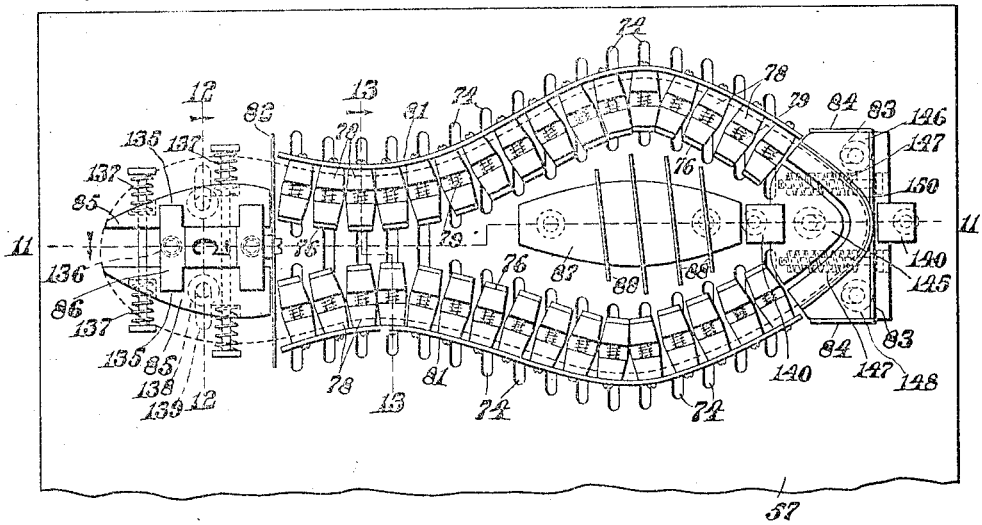
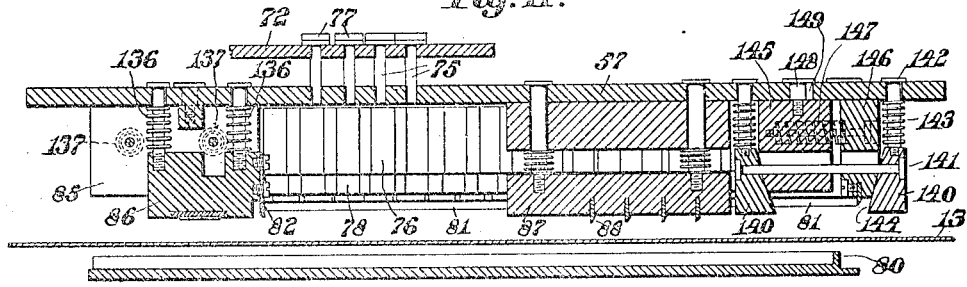
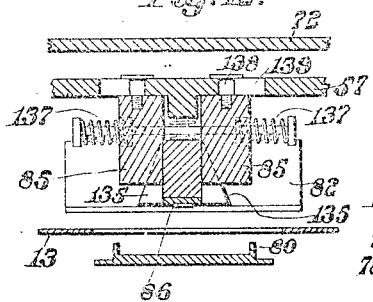
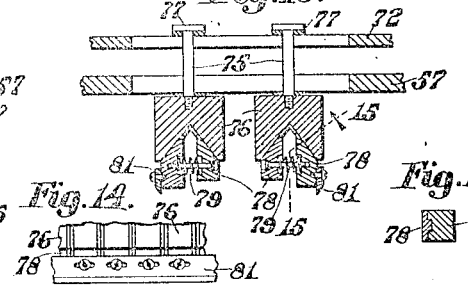
Witnesses:
Howard Hanscom
Nathan C. Lombard
Inventor:
Aaron Schwartz,
by Walter E. Lombard,
Atty.

ial 13 is adapt-
UNITED STATES PATENT OFFICE.

AARON SCHWARTZ, OF BOSTON, MASSACHUSETTS.

MACHINE FOR APPLYING DUCK TO INNERSOLES.

No. 919,648.  Specification of Letters Patent.  Patented April 27, 1909.

Application filed April 6, 1908. Serial No. 425,553.

*To all whom it may concern:*

Be it known that I, AARON SCHWARTZ, a citizen of the United States of America, and a resident of Boston, in the county of Suffolk and State of Massachusetts, have invented certain new and useful Improvements in Machines for Applying Duck to Innersoles, of which the following is a specification.

This invention relates to machines for manufacturing inner soles and particularly that class of inner soles the upper face of which is provided with a layer of canvas or similar flexible material and it has for its particular object the provision of a means for applying said flexible material to the main leather portion of the sole.

It consists in certain novel features of construction and arrangement of parts which will be readily understood by reference to the description of the drawings and to the claims hereinafter given.

Of the drawings: Figure 1 represents a longitudinal section through a machine embodying the features of this invention. Fig. 2 represents a vertical section of the same, the cutting plane being on line 2—2 on Fig. 1, looking in the direction of the arrow. Fig. 3 represents a transverse vertical section through one end of the machine, the cutting plane being on line 3—3 on Fig. 1, looking in the direction of the arrow. Fig. 4 represents a horizontal section of a portion of the same, the cutting plane being on line 4—4 on Fig. 1, looking in the direction of the arrow.
Fig. 5 represents a horizontal section of the same, the cutting plane being on line 5—5 on Fig. 1, looking in the direction of the arrow. Fig. 6 represents a horizontal section of a portion of the same, the cutting plane being on line 6—6 on Fig. 1, looking in the direction of the arrow. Fig. 7 represents a horizontal section of a portion of the same, the cutting plane being on line 7—7 on Fig. 2. Fig. 8 represents a vertical section of a portion of the same the cutting plane being on line 8—8 on Fig. 6. Fig. 9 represents a vertical section of a portion of the same, the cutting plane being on line 9—9 on Fig. 6. Fig. 10 represents an inverted plan of one of the adjustable cutting devices and a portion of the supporting plate therefor. Fig. 11 represents a vertical section of the same, the cutting plane being on line 11—11 on Fig. 10, looking in the direction of the arrow. Fig. 12 represents a transverse section of the same, the cutting plane being on line 12—12 on Fig. 10, looking in the direction of the arrow. Fig. 13 represents a vertical section of the same, the cutting plane being on line 13—13 on Fig. 10, looking in the direction of the arrow. Fig. 14 represents an elevation of a portion of one of the cutting knives and the adjustable supports therefor, and Fig. 15 represents a section through one of the adjustable knife supports and nipping members, the cutting plane being on line 15—15 on Fig. 13, looking in the direction of the arrow.

Similar characters designate like parts throughout the several figures of the drawings.

In the drawings, 10 represents two side frames each of which is provided at one end with a bracket 11 carrying a revoluble drum 12 on which is mounted a roll of flexible material 13. This piece of material 13 is adapted to be fed from the drum 12 over a roller 14 from which it is adapted to pass between two revoluble cylinders 15 and 16. The cylinder 15 is partially within a receptacle 17 adapted to contain an adhesive material 18. The cylinder 15 is mounted upon the revoluble member 18* having suitable bearings in the side frames 10.

As the flexible material 13 passes over the drum 15 it causes the same to be revolved thereby picking up a certain amount of adhesive material contained within the receptacle 17, any surplus amount thereof being removed during the revolution of said cylinder 15 by means of the usual doctor plate 19. Secured to one end of the member 18 is a gear 20 meshing with a gear 21 secured to the revoluble shaft 22 provided with a plurality of radial arms 23 forming an agitator for the adhesive material. This agitator 23 causes the adhesive material to be continuously agitated and circulated throughout the receptacle. Beneath the receptacle 17 is a compartment 24 to which superheated steam is admitted through a pipe 25 to maintain the adhesive material in a heated state under all conditions.

The cylinder 16 is located above the cylinder 15 and serves as a pressure roller it being mounted upon a revoluble shaft 26 having bearings in blocks 27 adapted for movement toward and from the axis of the cylinder 15 and maintained under any well-known spring tension device such as 28, which tension device may be adjusted by means of the usual adjusting nut 29.

As the piece of material 13 passes between the cylinder 15 and 16 it is obvious that a thin coat of adhesive material in heated state will be transferred to the under side of said piece of material. As the piece of material is fed along it passes between the bar 30 and the scraper 31 which spreads the adhesive material evenly over the under face of the flexible material allowing any surplus to return into the receptacle 17.

At the other end of the machine is a revoluble roller 32 under which the piece of material passes while at the extreme end of the side frames 10 is mounted a revoluble roller 33 over which the piece of material passes on its way to the feed roll 34 and the receiving drum 35 both mounted in brackets 36 secured to the other end of the side frames 10.

The feed roll 34 is provided with a gear 37 meshing with a segmental gear 38 revoluble with the main driving shaft 39, this series of gears providing a means of feeding the flexible material through the machine.
Intermediate the delivery drum 12 and the receiving drum 35 is a plate 40 secured at each end of the projecting member 41 upon each side frame 10. In an opening in each projection 41 is mounted a nut 42, the periphery of which is provided with bevel gear teeth 43. The gear 43 is adapted to be engaged by the teeth of the segmental gear 44 during its revolution to cause the threaded rod 45 operated upon by said nut 42 to be raised by the revolution of said segmental gear. On the top of said threaded rods 45 is mounted a supporting table 46 on which rests a plurality of stacks 47 of leather soles, between suitable vertical guides 48 secured to the plate 40 and extending through openings in said movable table 46. These guides 48 serve to position the leather soles or blanks in the various stacks. Over the plurality of stacks 47 is slidably mounted in horizontal slots in the side frames 10 a separating plate 49, one edge of which is tapered to a knife edge, as shown at 50.

To each side of the plate 49 is pivoted a link 51 the opposite end of which is pivotally secured to the arm 52, pivoted at 53 to the side frames 10. A projection 54 on the arm 52 extends into the cam groove 55 of a disk 56 secured to and revoluble with the driving shaft 39 and causes a reciprocation of the plate 49 during the revolution of said disk, the cam slot 55 being so constructed as to cause no movement of the arm 52 during a certain portion of the revolution of said disk.

The operation of the cam 55 upon the arm 54 will cause the plate 49 to be withdrawn so that its rear end extends nearly into contact with the roller 33. When in this position the nut 43 is operated upon by means of the gear 44 to cause the table 46 to be lifted slightly so that the upper blank or sole in each of the stacks 47 is slightly above the lower face of the plate 49. When the table has been thus lifted to bring the upper blank or sole in each stack into this position, the cam 55 will operate upon the arm 52 to cause a forward movement of the plate 49, the knife edge 50 thereof entering between the upper blank or sole of each stack and those beneath it, thus lifting one of the blanks or soles onto the upper face of the plate 49, which then becomes a support therefor. When the blank or sole is in this position, supported upon the plate 49 the piece of flexible material 13 rests thereon and immediately above the piece of flexible material is mounted in vertical guides 56 a vertically movable frame 57 carrying a suitable adjustable cutting die 58 on the under face thereof. In ears 59 projecting upwardly from the upper face of said movable member are two parallel rods 60 with which the forked end of a bell crank lever 61 engages, said bell crank lever each being pivoted at 62 to the end frame 10. The other arm of each bell crank lever is connected by means of a link 63 to the member 64 adjustably mounted upon the upper end of a rod 65, the lower end of which has secured thereto the forked member 66 straddling the shaft 67 mounted in a bearing in the side frame 10 and having secured on its inner end the segmental gear 44 and on its outer end a gear 68 and cam disk 69. The cam disk 69 is provided with a cam path 70 which engages with a stud or roller 71 secured to the member 66 and causes a vertical reciprocation of said rod 65 during the revolution of the disk 69. This vertical reciprocation of the rod 65 and the blocks 64 secured thereto causes the bell crank lever 61 to be moved about their pivots 62 to effect a vertical reciprocation of the member 57.

The member 57 is provided with a chamber within which is mounted the plate 72 adjustably vertically therein by means of the members 73. The under wall of the member 57 is provided with a plurality of parallel slots 74 in each of which is mounted a shank 75 of an adjustable block 76. Each shank extends through a similar slot in the plate 72 and is provided with a head 77 against which the plate 72 is forced by means of the adjusting member 73 to secure the blocks 76 in adjusted position.

Each of the blocks 76 is provided with a V-shaped depression in its under side having dovetailed to each wall thereof a nipper member 78, said members being separated normally by means of the spring 79. When the member 57 is lowered so that the members 78 come into contact with the piece of material 13, they force this material down into contact with the upper face of the blank or sole and the members 78 straddle the upturned lip 80 formed upon said blank or sole, thereby causing the piece of material to be folded neatly over this lip and as pressure is brought to bear upon the movable member 57 the nippers 78 will be forced farther into the V-shaped grooves in the block 76 causing the two nippers to move toward each other and retain the material in contact with the side walls of the lip 80 until the pressure thereon ceases and the movable member 57 is again raised.

The blocks 76 may be adjusted on the members 57 to conform to any desired shape of sole or other blank and secured to the series of outer members 78 are cutting knives 81 which are adapted when the member 57 is depressed, to cut from the piece of material 13 a blank conforming to the shape of the front portion of the sole. At a point just in front of the heel portion of the sole the member 57 is provided with a transverse knife 82, which makes an incision in the material at a point just in front of the heel so that no flexible material is applied to the heel portion of the sole. In like manner, the toe block 83 is provided with the knife edges 84 which cut from the piece of material triangular portions of waste material which are taken care of in any well-known manner. The heel blocks 85 are adapted to bear upon that portion of the lips 80 which are on the heel end of the sole to force these lips downwardly into contact with the remaining portion of the sole. Intermediate said blocks 85 is a spring-pressed stamp 86 bearing a suitable designating character which is adapted to stamp a character or the size number of the sole being made. In the sole portion of the die is mounted a yieldable spring-pressed block 87 provided with a plurality of cutting knives 88 which are adapted to slash the flexible material as it is being applied to the sole or blank, these parallel incisions rendering the forepart of the sole more flexible.

Intermediate the adhesive applying mechanism and the cutting mechanism is a revoluble shaft 89 provided with a plurality of cutting disks 90 which are adapted to cut the piece of material 13 into strips as it is fed beneath the cutting dies. The knife blades 90 revolve in oil in a receptacle 91 formed upon one side of the adhesive receptacle 17. This means for cutting the piece of material 13 into strips is provided in order that the flexible material may be more readily applied to the sole or blank to conform to its irregular contour.

When a blank has been cut from the piece of material 13 and pressure applied thereto to cause it to adhere to the upper face of the sole or blank and the side walls of the lip 80 thereon, the plate 49 will be moved by the arm 52 to the right of Fig. 1, car ing therewith the finished sole with the fl  le material applied thereto. This moven t of the sole with the plate 49 is insured by means of the fingers 92 pivoted at 93 to the front end of said plate 49 and held by means of the spring 94 slightly above the upper surface of the plate 49 so as to provide a shoulder which will engage with the sole or blank and carry it with said blank in a direction to the right of Fig. 1. The heel end of the sole or blank at the same time is positioned by means of the movable members 95 held normally in contact with the edges of the sole by means of a spring 96, the whole device being secured to a block 97 adjustable by means of the device 98 in a slot 99 in the plate 49.

As the plate 49 with the sole thereon approaches the extreme of its movement to the right of Fig. 1 the inclined plate 100 will lift the sole or blank upwardly and cause it to be moved beneath the gripper 101 pivoted at 102 to the side frames 10 and provided with an arm 103 engaging a cam 104 revoluble with the roll 33, the cam 104 operating said gripper 101 to cause it to be opened just prior to the moment that the plate 49 reaches the extreme of its movement. When the cam 104 has accomplished its purpose the spring 105 will cause the gripper to impinge upon the sole or blank and retain it while the plate 49 is moving again in the opposite direction. When this plate 49 has passed from beneath the sole or blank said sole or blank will be dropped as indicated at 106 in Fig. 1 onto the plate 107 the cam 104 at this time again operating the gripper 101 to release it and permit the finished sole to slide down the incline 107 into the receptacle 108.

The receiving drum 35 is driven by means of the pulley 109 on the shaft thereof connected by means of a belt 110 to a pulley 111 secured to the driving shaft 39. On the shaft 39 is also secured a gear 112 which meshes with a gear 68 adapted to drive the segmental gear 44 and the cam disk 69. The gear 68 in turn meshes with an intermediate gear 113, the teeth of which are in mesh with a gear 114 on the shaft 89, thereby providing a means whereby the rotary cutting disks 90 may be driven to separate the piece of material 13 into strips before being fed between the cutting and pressure mechanisms 58 and the sole or blank supported by the table 49.

It is o vious that provision must be made to feed the strip 13 intermittently so that there will be no movement thereof during the operation of cutting the blank therefrom and during the time that pressure is being applied thereto to cause it to adhere to the blank or sole supported by the table 49. To provide this method of feeding the strip, disks 115 are secured to the shaft 116 of the roll 34 at each end of said roll and said disks are supplied with a plurality of radial prongs 115* which engage the piece of flexible material 13 and cause it to be fed whenever the roll 34 and the disks 115 are revolved. The gear 37 mounted upon the shaft 116 of the roll 34 meshes with the segmental gear 38 removably secured to the gear 112. This segment may be made of any length to correspond with the length of the sole being operated upon, it being obvious that the roll 34 only revolves when the teeth of the segment 38 are in mesh with the gear 37 and that for the remaining part of the revolution of said shaft the roll 34 remains at rest and no feeding of the strip 13 occurs. It is during this period when the strip is at rest that the pressure applying and cutting devices operate and the feeding is discontinued until these devices are again lifted from contact with said piece of material.

In order to provide a ready means for quickly returning the table 46 to its lower position a clutch mechanism is mounted upon the upper end of each of the threaded rods 45 beneath the table 46. This clutch mechanism consists of a collar 117 pinned to the rod 45 and provided with a spring-pressed pawl 118 which is caused by said spring to normally engage with the teeth 119 on the inner face of an annular flange projecting upwardly from a worm gear 120 loosely mounted upon said rod 45.

The worm gear 120 is engaged by a worm 121 secured to a shaft 122 extending across the machine and mounted in bearings in the side frames 10, said shaft being prevented from lateral movement in said bearings by means of the collars 123 secured thereto and bearing against the inner faces of said bearings. Each end of the shaft 122 is provided with a squared end 124 on which may be placed a suitable socket wrench to turn said shaft in the direction of the arrow "b" on Fig. 7.

It is obvious that if the worm gear 120 is turned in the direction indicated by the arrow "b" on Fig. 7, and the nut 42 is prevented from turning during this operation, the threaded rods 45 will be turned in said nut to permit the table 46 to be lowered to its lowest position. In order to prevent the nut 42 from being turned during this operation it is necessary that the operation should be effected only when the gear 43 is in mesh with the segmental gear 44, this meshing of the two gears effectually preventing the movement of the nut 42 during the operation.

In order to insure that the shaft 122 may be turned only when these gears are in mesh the cam disk 69 is made of sufficient diameter to extend over the end 124 of the shaft 122 and prevent access to the end 124. A certain portion, however, of the disk is cut away as at 125, the arc of such cut-away portion being slightly less than the arc of the gear segment 44, this cut-away portion permitting the operator to secure access to the end 124 when the gears 43 and 44 are in mesh and at no other time.

The adhesive tank 17 is connected by means of a pipe 126 to a receptacle 127 outside of one of the side frames 10, this receptacle 127 being supplied with adhesive which is free to flow through the pipe 126 in the receptacle 17. The outside receptacle 127 is provided with a suitable agitator 128 mounted upon a shaft 129 which has secured thereto a bevel gear 130 meshing with a gear 131 on an extension 132 to the shaft 18, this mechanism providing a constant agitation in the receptacle 127 at all times when the cylinder 15 is revolving.

Beneath the receptacle 127 is a chamber 133 into which superheated steam may be admitted through the pipe 134 from any suitable source. By such a construction as is herein shown a plurality of leather soles may be stacked upon the table 46 and intermittently raised so that the upper sole of each stack may be separated from those beneath it and supported upon the reciprocating plate 49 while at the same time a continuous piece of flexible material such as canvas is being fed from a roll and having applied to one face thereof a coating of heated adhesive material, mechanism being provided to insure the proper amount of adhesive being applied to all of the under surface of said flexible material as it passes through the machine.

It is obvious also that as the material is fed into a position above the sole to which it is desired to secure a thickness of canvas or other flexible material, the operation of feeding the piece of material will temporarily discontinue until such time that the cutting dies will descend into contact with said material and cut therefrom a blank conforming to the shape of the forward portion of the sole and by continuing its downward movement apply pressure thereto to cause the material to adhere permanently to the upper face of the sole.

When the heel portion of the lip 80 has been separated from the other part of the lip by means of the knife 82, the wedge-shaped block 135 comes into contact with the upper face of the sole and is forced upwardly against the tension of the springs 136, this upward movement of the block 135 causing, by means of the inclined walls thereof, a separation of the blocks 85 against the tension of the springs 137 which normally retain said blocks 85 in their innermost position. This outward movement of the blocks 85 causes them to wipe over the heel portion of the lip 80 and force it downwardly into contact with the outer edge portion of the sole, the blocks 85 being held in position by means of the headed studs 138 movable transversely of the sole in the slots 139 in the vertically movable member 57. At that end of the cutting die are mounted blocks 140 tied together by means of the rod 141 and yieldably supported in the movable member 57 by the shanks 142 surrounded by springs 143 interposed between the under face of the movable member 57 and the upper face of each block 140. These blocks 140 have inclined walls 144 with which coöperate the blocks 145 and 146 separated by means of the springs 147 and movably supported by means of the shanks 148 in the movable member 57, which is provided with slots 149 through which said supporting shanks extend.

The block 146 is provided with a knife 150 for cutting from the piece of flexible material the toe portion of the blank to be used upon the sole. When the movable member 57 is lowered the under faces of the blocks 140 come into contact with the piece of flexible material 13 and force it downwardly over the lip 80 and when the blocks 145 and 146 have reached a position on either side of said lip the continuation of the downward movement of said member 57 will cause the faces 144 on the blocks 140 to act upon the blocks 145 and 146 to force them together thereby nipping the material over the lip 80 and retaining it in position until the adhesive has affixed thereto, when an upward movement of the member 57 will permit the springs 143 and 147 to cause all of the parts to assume their normal position.

It is obvious from the foregoing description and from the drawings forming part of the application that the cutting devices may be adjusted to conform to any shape of sole and that provision is made whereby the canvas or other flexible material will be seized by a plurality of nipping members and forced into contact with the side walls of the usual upwardly projecting lip on the sole, thereby permanently affixing the canvas to all portions of the forepart of the sole and insuring that the lip 80 of the sole will maintain a position at right angles to the face thereof. It is also evident that provision is made for making the necessary incisions in that portion of the flexible material which is to be affixed to the forepart of the sole while at the same time the entire piece of material is being cut into strips which will more readily permit the material to be gathered by the nipping devices to permit them to take up a certain amount of slack and make the desired fold over the upwardly projecting lip 80.

To further facilitate the rapid manufacture of the completed sole, provision is made for simultaneously, with the cutting and pressing operations, affixing to the heel portion of the sole, which is not covered with canvas or other flexible material, a suitable designating character which will designate the sizes of the sole, while at the same time pressure is applied to that portion of the lip 80 on the heel end of the sole to cause it to be pressed downwardly and flattened in contact with the upper face of the sole. Provision is also made to keep the adhesive material in condition for operation at all times, both by keeping it heated by the circulation of the superheated steam or other heating medium, while the adhesive in the various tanks is agitated to keep it in continuous circulation.

The entire machine provides a means for rapidly manufacturing soles of this class which are covered with canvas, saving much manual labor and causing the soles to be delivered complete, ready for use in the manufacture of shoes.

It is believed that from the foregoing, the operation and many advantages of a machine of this class will be fully understood without further description.

Having thus described my invention, I claim:

1. In a machine of the class described, the combination of means for holding a stack of blanks; means for separating the upper blank from those beneath it; means for applying an adhesive to a piece of flexible material; means for feeding said piece into position above said blank; and a device for applying pressure to said piece to cause it to adhere to said blank.

2. In a machine of the class described, the combination of means for holding a stack of blanks; means for separating the upper blank from those beneath it; means for applying an adhesive to a piece of flexible material; means for feeding said piece into position above said blank; a device for applying pressure to said piece to cause it to adhere to said blank; and means for cutting from said piece a portion to conform to said blank.

3. In a machine of the class described, the combination of means for holding a blank; means for applying an adhesive to a piece of flexible material; means for feeding said piece into position above said blank; a device for applying pressure to said piece to cause it to adhere to said blank; and means for cutting from said piece a portion to conform to said blank.

4. In a machine of the class described, the combination of means for holding a blank; means for applying an adhesive to a piece of flexible material; means for feeding said piece into position above said blank; a device for applying pressure to said piece to cause it to adhere to said blank; and adjustable means for cutting from said piece a portion to conform to said blank.

5. In a machine of the class described, the combination of means for holding a blank; means for applying an adhesive to a strip of flexible material; means for feeding said piece into position above said blank; a device for applying pressure to said piece to cause it to adhere to said blank; and a plurality of knives for cutting from said piece a portion to conform to said blank.

6. In a machine of the class described, the combination of means for holding a blank; means for applying an adhesive to a piece of flexible material; means for feeding said piece into position above said blank; a device for applying pressure to said piece to cause it to adhere to said blank; a plurality of knives adapted to operate upon said piece of material; and means for varying the position of said knives to make the portion cut thereby conform to the outline of said blank.

7. In a machine of the class described, the combination of means for holding a blank; means for applying an adhesive to a piece of flexible material; means for feeding said piece into position above said blank; a device for applying pressure to said piece to cause it to adhere to said blank; a plurality of knives adapted to operate upon said piece of material; means for varying the position of said knives to make the portion cut thereby conform to the outline of said blank; a device for marking said blank during the operation of the cutting mechanism; and mechanism for simultaneously cutting a plurality of incisions in said piece of flexible material.

8. In a machine of the class described, the combination of means for holding an inner sole provided with an upturned lip adjacent to its edge; mechanism for applying an adhesive to a piece of flexible material and feeding said piece into position above said blank; and devices for cutting a blank from said piece and applying pressure thereto to cause it to adhere to said sole, said devices including means for nipping said flexible material and retaining it temporarily in contact with the sides of said lip.

9. In a machine of the class described, the combination of means for holding an inner sole provided with an upturned lip adjacent to the edge; mechanism for applying an adhesive to a piece of flexible material and feeding said piece into position above said blank; and devices for cutting a blank from said piece and applying pressure thereto to cause it to adhere to said sole, said devices including adjustable means for nipping said flexible material and retaining it temporarily in contact with the sides of said lip.

10. In a machine of the class described, the combination of means for holding an inner sole provided with an upturned lip adjacent to its edge; mechanism for applying an adhesive to a piece of flexible material and feeding said piece into position above said blank; and devices for cutting a blank from said piece and applying pressure thereto to cause it to adhere to said sole, said devices including adjustable means normally separated but adapted under pressure to nip said flexible material and retain it temporarily in contact with the sides of said lip.

11. In a machine of the class described, the combination of means for holding an inner sole provided with an upturned lip adjacent to its edge; mechanism for applying an adhesive to a piece of flexible material and feeding said piece into position above said blank; and devices for cutting a blank from said piece and applying pressure thereto to cause it to adhere to said sole, said devices including a spring-pressed block provided with a plurality of knives adapted under pressure to cut incisions in said piece of flexible material.

12. In a machine of the class described, the combination of means for holding a stack of inner soles; mechanism for applying an adhesive to a piece of flexible material and feeding said piece into position above said blank; mechanism for cutting a blank from said piece and applying pressure thereto to cause it to adhere to said sole; means for separating the upper sole from said stack; and mechanism for intermittently raising said stack of soles.

13. In a machine of the class described, the combination of means for holding a stack of inner soles; mechanism for applying an adhesive to a piece of flexible material and feeding said piece into position above said blank; mechanism for cutting a blank from said piece and applying pressure thereto to cause it to adhere to said sole; mechanism for intermittently raising said stack of soles; and a sliding member adapted to separate the upper sole from those beneath it.

14. In a machine of the class described, the combination of means for holding a stack of inner soles; mechanism for applying an adhesive to a piece of flexible material and feeding said piece into position above said blank; mechanism for cutting a blank from said piece and applying pressure thereto to cause it to adhere to said sole; mechanism for intermittently raising said stack of soles; a sliding member adapted to separate the upper sole from those beneath it; and yielding devices on said sliding member for positioning a sole thereon.

15. In a machine of the class described, the combination of means for holding a stack of inner soles; mechanism for applying an adhesive to a piece of flexible material and feeding said piece into position above said blank; mechanism for cutting a blank from said piece and applying pressure thereto to cause it to adhere to said sole; mechanism for intermittently raising said stack of soles; a sliding member adapted to separate the upper sole from those beneath it; and a spring operated finger adapted to engage said sole and remove it from the stack when the operation of affixing the portion of flexible material to the sole has been completed, 16. In a machine of the class described, the combination of means for holding a stack of inner soles; mechanism for applying an adhesive to a piece of flexible material and feeding said piece into position above said blank; mechanism for cutting a blank from said piece and applying pressure thereto to cause it to adhere to said sole; mechanism for intermittently raising said stack of soles; a sliding member adapted to separate the upper sole from those beneath it; a spring operated finger adapted to engage said sole and remove it from the stack when the operation of affixing the portion of flexible material to the sole has been completed; and gripping mechanism adapted to seize the completed sole and retain it until the slidable member has been removed from beneath it.

17. In a machine of the class described, the combination with means for holding a row of soles; of mechanism for applying an adhesive to a piece of flexible material and feeding the same to a position above said soles; mechanism for applying pressure to said strip to cause it to adhere to said soles; and a plurality of cutters adapted to cut said piece of flexible material into a plurality of strips.

18. In a machine of the class described, the combination of a table for supporting a sole; means for raising said table intermittently; means for feeding a piece of material to a position above said sole; cutting and pressure mechanisms for removing from said piece of material a blank conforming to the contour of said sole and affixing it to said sole; and means for throwing out of engagement said raising mechanism and lowering said table to its normal position.

19. In a machine of the class described, the combination of a table for supporting a sole; means for raising said table intermittently; means for feeding a piece of material to a position above said sole; cutting and pressure mechanisms for removing from said piece of material a blank conforming to the contour of said sole and affixing it to said sole; and clutch mechanism for throwing out of engagement said raising mechanism and lowering said table to its normal position.

Signed by me at 7 Water St., Boston, Mass., this 4th day of April, 1908.

AARON SCHWARTZ.

Witnesses:
 WALLER E. LOMBARD,
 NATHAN C. LOMBARD.